United States Patent Office 3,704,325
Patented Nov. 28, 1972

3,704,325
PROCESS FOR TRIS (HYDROXYMETHYL) PHOSPHINE BY USE OF HIGH BOILING SOLVENT
Richard Frederick Stockel and William Frank Herbes, Bridgewater Township, Somerset County, N.J., assignors to American Cyanamid Company, Stamford, Conn.
No Drawing. Filed Nov. 27, 1970, Ser. No. 93,404
Int. Cl. C07f 9/50
U.S. Cl. 260—606.5 P         3 Claims

ABSTRACT OF THE DISCLOSURE

Production of tris(hydroxymethyl)phosphine of high purity and relatively free of water. Phosphine is reacted with about three moles of formaldehyde in the presence of a high boiling organic solvent at elevated temperatures and pressures.

---

This invention relates to an improved process for producing tris(hydroxymethyl)phosphine. More particularly, it relates to the use of a high boiling organic solvent in the reaction of phosphine with formaldehyde to produce tris(hydroxymethyl)phosphine.

Tris(hydroxymethyl)phosphine is an important chemical of use in flame retardant compositions for textiles and plastics. It is also an intermediate in the preparation of other phosphorus-containing compounds, many of which are flame retardants. Tris(hydroxymethyl)phosphine is further useful as an oil additive and pest-control agent.

Prior art processes for tris(hydroxymethyl)phosphine give undesirable by-products and/or are uneconomical. For example, the reaction of phosphine with aqueous formaldehyde provides tris(hydroxymethyl)phosphine oxide, hemiacetals and secondary phosphines. Also, the tris(hydroxymethyl)phosphine is obtained as an aqueous solution and additional operations are required if an anhydrous product is desired.

In a suggested modification of the process, metallic catalysts, preferably platinum salts, are employed and a water-soluble organic solvent, such as ethanol, dioxane or acetonitrile, is employed alone or with water. However this process is also uneconomical due to the catalysts employed.

It is therefore an object of this invention to produce tris(hydroxymethyl)phosphine of high purity and in good yield.

A further object is to produce tris(hydroxymethyl)phosphine substantially free from water.

These and other objects of the invention will become apparent as the description thereof proceeds.

It has now been discovered that when the reaction of phosphine and formaldehyde is carried out in an inert, high boiling, water-immiscible organic solvent, tris(hydroxymethyl)phosphine is economicaly produced in high yield and with good purity. Little or no by-products such as tris(hydroxymethyl)phosphine oxide, hemiacetals, or secondary phosphines are formed. The reaction conditions do not have to be as carefully controlled as they do in other known processes for tris(hydroxymethyl)phosphine. The tris(hydroxymethyl)phosphine is easily isolated as an essentially pure product. It is relatively free of water and can be used in many nonaqueous reactions.

In the process of this invention, phosphine and formaldehyde are reacted in an inert, high boiling, water-immiscible, organic solvent. The reaction is carried out under pressure and agitation, preferably in a pressure vessel which can provide good mixing of the reactants. A reaction temperature between 60° and 100° C., preferably 70° and 80° C., is employed. When a temperature above 100° C. is employed, it has been found that decomposition and rearrangement products are produced, the amounts becoming significant above 125° C. Temperatures below 60° C. are impractical. A pressure above 300 p.s.i.g., preferably between 400 and 800 p.s.i.g., is used.

The reaction in theory requires the use of 3 moles of formaldehyde (HCHO) per mole of phosphine, and that amount, or a very slight excess or deficiency, of formaldehyde in the form of paraformaldehyde is employed.

The high boiling, water-immiscible, organic solvent must be inert under the reaction conditions and have a boiling point above 10° C. in order to keep the amount of solvent vapor in the reactor at a minimum. Representative suitable solvents include aromatic hydrocarbons such as toluene and xylene and the like; halogenated aromatic hydrocarbons such as chlorobenzene and o-dichlorobenzene; aliphatic hydrocarbons such as the octanes and nonanes, and ethers such as dibutyl ether and ethylene glycol dibutyl ether. The preferred solvent is xylene.

Sufficient solvent should be used to provide a freely stirrable slurry or suspension of paraformaldehyde in the solvent. The amount of solvent will depend somewhat on the particular solvent, but ranges generally from 30% to 60% based on the combined weight of the paraformaldehyde and solvent.

In one preferred procedure for carrying out the reaction, a suspension of paraformaldehyde in the high boiling solvent is heated to the reaction temperature. Phosphine is then introduced and the reaction temperature is maintained until the consumption of phosphine stops. When the reaction mixture is cooled, two layers are present, one consisting primarily of solvent and the other of tris(hydroxymethyl)phosphine. The two layers can be separated mechanically. When the preferred solvent, xylene, is employed, the tris(hydroxymethyl)phosphine layer contains about 90–92% of tris(hydroxymethyl)phosphine, about 7% of water and about 1–3% of xylene. For many purposes, the product is sufficiently pure to be used without further purification. The yield of tris(hydroxymethyl)phosphine by the process of this invention is nearly quantative (at least 98% of theory based on the amount of paraformaldehyde used).

In summary, the process of this invention offers the following advantages over the aqueous processes of the prior art:

(1) A higher yield of product is obtained.
(2) The product is purer. In the aqueous process, by-products impart a very disagreeable odor to the desired product. In the process of this invention, there are fewer by-products and they mostly remain in the solvent layer when the product layer is separated.
(3) The fact that there is only a relatively small amount of water in the product is important for two reasons:
(a) The product with only low water content may be used in an non-aqueous system.
(b) Tris(hydroxymethyl)phosphine is not a very stable compound, and it is even less stable in the presence of water. A 50% aqueous solution, as is usually obtained in prior art processes, is less stable than the inventive product containing only 7% water. Removal of water from an aqueous solution of tris(hydroxymethyl)phosphine by distillation would cause still greater decomposition.

EXAMPLE 1

A mixture of 300 g. (10 moles) of paraformaldehyde and 350 g. of xylene was heated in a pressure vessel to 75° C. and 50 p.s.i.g., and 116 g. (3.4 moles) of phosphine was added. The temperature was maintained at 75° C. for one hour. When cooled to about 45° C., the mixture separated into two layers, a top layer of xylene and a bottom layer of tris(hydroxymethyl)phosphine. The two layers were separated mechanically. The tris(hydroxymethyl)phosphine layer contained about 90% of tris(hydroxymethyl)phosphine, about 7% of water and about 3% of xylene. Analysis by nuclear magnetic resonance indicated that the tris(hydroxymethyl)phosphine was highly pure.

We claim:

1. A process for producing tris(hydroxymethyl)phosphine in substantially quantitative yield comprising reacting phosphine with about 3 moles of formaldehyde in an inert, high boiling, water-immiscible, organic solvent at a temperature of about 60° to 100° C. and a pressure of about 300 to 800 p.s.i.g.

2. The process of claim 1 wherein the formaldehyde is paraformaldehyde.

3. The process of claim 1 wherein the solvent is xylene.

References Cited

UNITED STATES PATENTS 3,030,421  4/1962  Reuter et al. ____ 260—606.5 P

TOBIAS E. LEVOW, Primary Examiner

W. F. W. BELLAMY, Assistant Examiner